United States Patent
Obayashi (10) Patent No.: US 9,407,784 B2
(45) Date of Patent: Aug. 2, 2016

(54) IMAGE PROCESSING APPARATUS, CONTROL METHOD THEREOF, AND STORAGE MEDIUM

(71) Applicant: CANON KABUSHIKI KAISHA, Tokyo (JP)

(72) Inventor: Yosuke Obayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/633,959

(22) Filed: Feb. 27, 2015

(65) Prior Publication Data

US 2015/0261478 A1    Sep. 17, 2015

(30) Foreign Application Priority Data

Mar. 13, 2014  (JP) ................. 2014-050534

(51) Int. Cl.
*G06F 3/12*    (2006.01)
*H04N 1/00*    (2006.01)

(52) U.S. Cl.
CPC ....... *H04N 1/00896* (2013.01); *H04N 1/00888* (2013.01); *H04N 1/00928* (2013.01); *H04N 1/00931* (2013.01)

(58) Field of Classification Search
None
See application file for complete search history.

(56) References Cited

U.S. PATENT DOCUMENTS

| 8,384,924 | B2* | 2/2013 | Sato | H04N 1/00965 358/1.1 |
| 8,400,646 | B2* | 3/2013 | Yamada | H04N 1/0096 358/1.13 |
| 9,313,364 | B2* | 4/2016 | Tanaka | H04N 1/32609 |
| 2009/0109458 | A1* | 4/2009 | Nagata | H04N 1/32144 358/1.9 |
| 2011/0109931 | A1* | 5/2011 | Nomura | H04N 1/0097 358/1.13 |
| 2011/0235079 | A1* | 9/2011 | Hara | G06K 15/022 358/1.13 |
| 2012/0275715 | A1* | 11/2012 | Okuyama | G06T 1/20 382/232 |
| 2015/0016734 | A1* | 1/2015 | Igarashi | G06T 9/00 382/232 |
| 2015/0244898 | A1* | 8/2015 | Tanaka | H04N 1/32496 358/1.13 |

FOREIGN PATENT DOCUMENTS

JP    2012-234337 A    11/2012

* cited by examiner

*Primary Examiner* — Dung Tran
(74) *Attorney, Agent, or Firm* — Fitzpatrick, Cella, Harper & Scinto (57) ABSTRACT

An image processing apparatus according to the present invention includes a storage unit configured to store in advance configuration data, for each plurality of the functional blocks, for configuring the functional blocks in the reconfigurable circuit. Upon accepting a user operation indicating a job to be executed via an operation unit, the image processing apparatus reconfigures the reconfigurable circuit by reading required configuration data from the storage unit before a start instruction to start the job is accepted.

8 Claims, 9 Drawing Sheets

IMAGE PROCESSING APPARATUS, CONTROL METHOD THEREOF, AND STORAGE MEDIUM

BACKGROUND OF THE INVENTION

1. Field of the Invention

The present invention relates to an image processing apparatus, a control method thereof, and a storage medium.

2. Description of the Related Art

A reconfigurable circuit such as a programmable logic device (PLD) or a field programmable gate array (FPGA) capable of changing the configuration of a logic circuit is well known. Generally, changing the configuration of a logic circuit of the PLD or the FPGA is achieved by writing circuit configuration information stored in a non-volatile memory such as a ROM into a configuration memory, which is a volatile memory included in the PLD or the FPGA, at the time of activation. Also, the information stored in the configuration memory is cleared when power is turned off, and it is therefore necessary to again write the circuit configuration information stored in the ROM into the configuration memory when power is turned on. The method as described above that changes the logic circuit of the PLDs or the FPGAs only once during power supply is called "static reconfiguration". In contrast, development has been underway to provide an FPGA or the like that is capable of dynamically changing the configuration of a logic circuit during operation of the logic circuit, and such a method that dynamically changes the logic circuit is called "dynamic reconfiguration".

There is an FPGA capable of not only rewriting the circuit configuration of the entire chip of the FPGA, but also rewriting only the circuit configuration of a specific area in the chip. Such rewriting is called "partial reconfiguration". Particularly, changing the configuration of the circuitry on the chip excluding the circuit that is in operation without stopping the operation of that circuit is called "dynamic partial reconfiguration". In the dynamic partial reconfiguration, unlike the dynamic reconfiguration that rewrites the entire configuration memory, only a partial area in the configuration memory is rewritten. Accordingly, the logic circuit of the FPGA can be partially reconfigured. By using the dynamic partial reconfiguration described above, it is possible to, for example, mount a plurality of logic circuits in a specific area in an FPGA, and switch the logic circuits on a time shared basis. As a result, various functions that can fit for various applications can be flexibly implemented with the use of a fewer hardware resources while maintaining high-speed computing performance of hardware.

However, although the circuit configuration can be changed during operation, a long period of time is required to change (rewrite) the circuit configuration, and the time length is proportional to the size of logic circuit configuration information written into the configuration memory. To address this, techniques have been proposed to reduce the rewriting time required to rewrite the circuit configuration.

Japanese Patent Laid-Open No. 2012-234337 discloses a technique for reducing the conventional rewriting time by predicting processing that is very likely to be processed next during image processing, and loading in advance config data for implementing the predicted processing into a high-speed configuration memory. As a result of loading config data in advance, it is possible to shorten the loading time required to load the circuit configuration data during image processing, and achieve a faster image processing speed.

With an image processing apparatus such as a multi-function printer (MFP), a selection can be made from among a plurality of processing operations (copy job, print job, send job, and the like) in response to a request from the user, and each image processing is implemented by hardware or software. In addition, MFPs available in recent years have a power saving state from the viewpoint of reducing power consumption, and also have a function of making a transition to the power saving state when no access is made to the MFP for a fixed period of time and recovering from the power saving state when the MFP is used again. Particularly, demand is increasing for reducing the recovery period required to recover from the power saving state as short as possible so as to provide fast availability of the MFP and enhance usability for the user.

However, the conventional technique described above has the following problems. For example, if the reconfiguration technique is applied to an image processing unit provided in an image processing apparatus, it is possible to speed up the rewriting time required to rewrite the config data during image processing. However, if the user makes a setting change, the content of processing to be performed by the image processing unit is not fixed until a request to start the processing is received from the user. Accordingly, with the above-described conventional technique, the config data is loaded after the user issues a request to start processing and the content of processing is fixed. For this reason, the time required to start processing is not accelerated.

SUMMARY OF THE INVENTION

The present invention enables realization of a system that configures a circuit in which a required image processing circuit can be reconfigured according to previous user operations before the user issues an instruction to start processing so as to shorten the time it takes to start processing after receipt of the instruction to start processing.

One aspect of the present invention provides an image processing apparatus including a reconfigurable circuit in which functional blocks that perform image processing can be reconfigured, the image processing apparatus comprising: a first storage unit configured to store in advance configuration data, for each plurality of the functional blocks, for configuring the functional blocks in the reconfigurable circuit; an operation unit configured to accept a user operation for inputting a job; and a reconfiguration unit configured to, upon accepting the user operation indicating the job to be executed via the operation unit, read required configuration data from the first storage unit and reconfigure the reconfigurable circuit before a start instruction to start the job is accepted.

Another aspect of the present invention provides an image processing apparatus including a reconfigurable circuit in which functional blocks that perform image processing can be reconfigured, the image processing apparatus comprising: a first storage unit configured to store in advance configuration data, for each plurality of the functional blocks, for configuring the functional blocks in the reconfigurable circuit; a readable and writable second storage unit that has a faster reading speed than that of the first storage unit; an operation unit configured to accept a user operation for inputting a job; a writing unit configured to, upon accepting the user operation indicating the job to be executed via the operation unit, read the configuration data of a required functional block from the first storage unit and write the configuration data into the second storage unit before a start instruction to start the job is accepted; and a reconfiguration unit configured to read the required configuration data written by the writing unit from the second storage unit and reconfigure the reconfigurable circuit.

Still another aspect of the present invention provides a control method for controlling an image processing apparatus including a reconfigurable circuit in which functional blocks that perform image processing can be reconfigured, and a first storage unit configured to store in advance configuration data, for each plurality of the functional blocks, for configuring the functional blocks in the reconfigurable circuit, the method comprising: performing an operation to accept a user operation for inputting a job, which is performed by an operation unit; and upon accepting the user operation indicating the job to be executed in the operation, read required configuration data from the first storage unit and reconfiguring the reconfigurable circuit before a start instruction to start the job is accepted, which is performed by a reconfiguration unit.

Yet still another aspect of the present invention provides a control method for controlling an image processing apparatus including a reconfigurable circuit configured to be capable of reconfiguring functional blocks that perform image processing, a first storage unit configured to store in advance configuration data, for each plurality of the functional blocks, for configuring the functional blocks in the reconfigurable circuit, and a readable and writable second storage unit that has a faster reading speed than that of the first storage unit, the method comprising: performing an operation to accept a user operation for inputting a job, which is performed by an operation unit; upon accepting the user operation indicating the job to be executed in the operation, reading the configuration data of required functional blocks from the first storage unit and writing the configuration data into the second storage unit before a start instruction to start the job is accepted, which is performed by a writing unit; and reading the required configuration data written in the writing from the second storage unit and reconfiguring the reconfigurable circuit, which is performed by a reconfiguration unit.

Still yet another aspect of the present invention provides a non-transitory computer-readable storage medium storing a computer program for causing a computer to execute the processing of the control method for controlling the image processing apparatus.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration of Image Processing Apparatus

Figure 1:
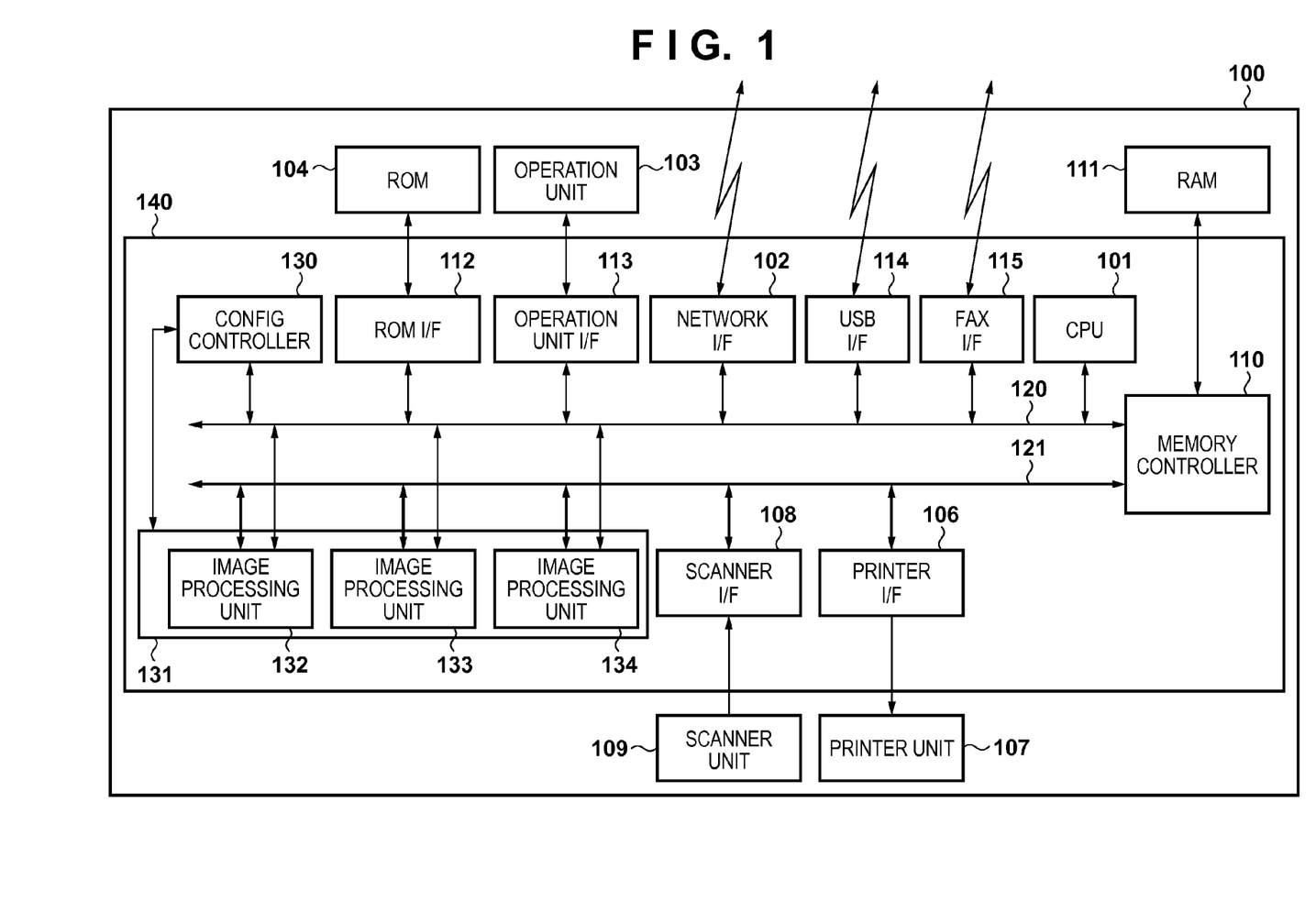
FIG. 1 is a block diagram showing an example of a configuration of an image processing apparatus according to a first embodiment.

Hereinafter, a first embodiment of the present invention will be described with reference to FIGS. 1 to 5. FIG. 1 is a block diagram illustrating an apparatus configuration of an image processing apparatus according to an embodiment of the present invention. The present embodiment will be described taking a case where an image processing apparatus 100 is a multifunction peripheral (multi-functional processing apparatus) including a scanner unit and a printer unit.

The image processing apparatus 100 includes an operation unit 103 for a user using the image processing apparatus 100 to perform various types of operations, a scanner unit 109 that scans image information of an original, and a printer unit 107 that prints an image on paper based on image data. The scanner unit 109 includes a CPU that controls the scanner unit 109, an illumination lamp for reading an original, a scan mirror, and the like. The printer unit 107 includes a CPU that controls the printer unit 107, a photosensitive drum, a fixing device and the like that are used to form (print) an image and fix the image. The operation unit 103 includes a power saving key. By the power saving key being pressed, a transition to a power saving state or recovery from the power saving state is performed.

Also, the image processing apparatus 100 includes an FPGA 140 including a dynamic reconfiguration unit as a controller that controls the image processing apparatus 100. In this example, the FPGA 140 includes a CPU 101 that performs overall control on the operations of the image processing apparatus 100. The CPU 101 executes a program for controlling the FPGA 140, a config controller 130 that controls reconfiguration, and the like. Although the FPGA 140 is internally provided with the CPU 101, this is merely an example, and the CPU may be provided outside the FPGA 140.

The image processing apparatus 100 also includes a ROM (first storage unit) 104 in which a boot program that is to be executed by the CPU 101 and logic circuit configuration information for configuring the FPGA 140 are stored. The image processing apparatus 100 also includes a RAM (second storage unit) 111 that serves as a system work memory for the CPU 101 to perform operations and an image memory for temporarily storing image data. The RAM 111 also serves as a memory for copying, storing and reading the logic circuit configuration information stored in the ROM 104 at a high speed.

The FPGA 140 includes the CPU 101, a network I/F 102, a printer I/F 106, a scanner I/F 108, a memory controller 110, a ROM I/F 112, an operation unit I/F 113, a USB I/F 114, a FAX I/F 115, the config controller 130, and a dynamic reconfiguration unit (reconfigurable circuit) 131. The reconfiguration unit 131 is dynamically reconfigurable (rewritable) and partially rewritable. To be specific, while a circuit reconfigured in a part of the reconfiguration unit 131 is in operation, another circuit can be reconfigured in another part that does not overlap with the part occupied by the circuit that is in operation. The reconfiguration unit 131 includes an image processing unit 132, an image processing unit 133 and an image processing unit 134 in which a logic circuit for performing various image processing operations can be partially reconfigured. In the present embodiment, a configuration is shown in which the number of image processing units constituting the reconfiguration unit 131 is three, but the number of image processing units is not limited to three. The config controller 130 controls the circuit configuration (configuration) of the reconfiguration unit 131.

The scanner I/F 108 receives an input of image data from the scanner unit 109. The printer I/F 106 outputs image data to a printer. The image processing units 132, 133 and 134 of the reconfiguration unit 131, the scanner I/F 108 and the printer I/F 106 are connected to an image bus 121 for transferring image data to be processed.

The CPU 101 performs overall control on the operations of the image processing apparatus 100, and performs communication (transmission and reception) with a general-purpose computer on a network via the network I/F (network interface) 102. The CPU 101 also performs communication (transmission and reception) with a general-purpose computer connected to the image processing apparatus 100 via the USB I/F (USB interface) 114. Also, the CPU 101 connects to a public line network via the FAX I/F (facsimile interface) 115, and performs communication (transmission and reception) with another image processing apparatus or a facsimile apparatus. The FAX I/F 115 includes a CI detection circuit that detects a call indicator (CI) signal from the public line network. The ROM I/F 112 controls writing and reading operations to and from the ROM 104 in which the boot program to be executed by the CPU 101 and the logic circuit configuration information (configuration data) for configuring the reconfiguration unit 131 are stored.

The FPGA 140 includes a system bus 120 that connects the CPU 101, the network I/F 102, the operation unit 103, the ROM I/F 112, the config controller 130 and the reconfiguration unit 131 with each other. The CPU 101 performs parameter setting for the image processing units 132, 133 and 134 configured in the configuration unit 131, the scanner I/F 108 and the printer I/F 106 via the system bus 120. The RAM 111 serves as a system work memory for the CPU 101 to perform operations, an image memory for temporarily storing image data and a memory for copying, storing and reading the logic circuit configuration information stored in the ROM 104 at a high speed. The memory controller 110 controls writing and reading operations to and from the RAM 111. The memory controller 110 is connected to the system bus 120 and the image bus 121, and performs exclusive switching between access of a bus master connected to the image bus 121 with respect to the RAM 111 and access of a bus master connected to the system bus 120 with respect to the RAM 111.

Config Data

Next, examples of image processing functions (functional blocks) that are configured in the reconfiguration unit 131 of the image processing apparatus 100 of the present embodiment and the relationship with respect to config data (configuration data) will be described with reference to FIG. 2. The image processing apparatus 100 has a function of copying an original read by the scanner unit 109 (copy job) and a function of printing print data transmitted from an external printer driver (PDL print job). The image processing apparatus 100 also has a function of printing fax data received via the FAX I/F 115 (fax job). Also, the image processing apparatus 100 has a send job that transmits an original read by the scanner unit 109 to an external general-purpose computer via the network I/F 102 as image data. In the case of an image processing system to which a dynamic reconfiguration technique is applied, actual processing is performed after required image processing functions are configured in the reconfiguration unit 131 according to the function selected by the user and the setting items that have been changed by the user.

Figure 2:
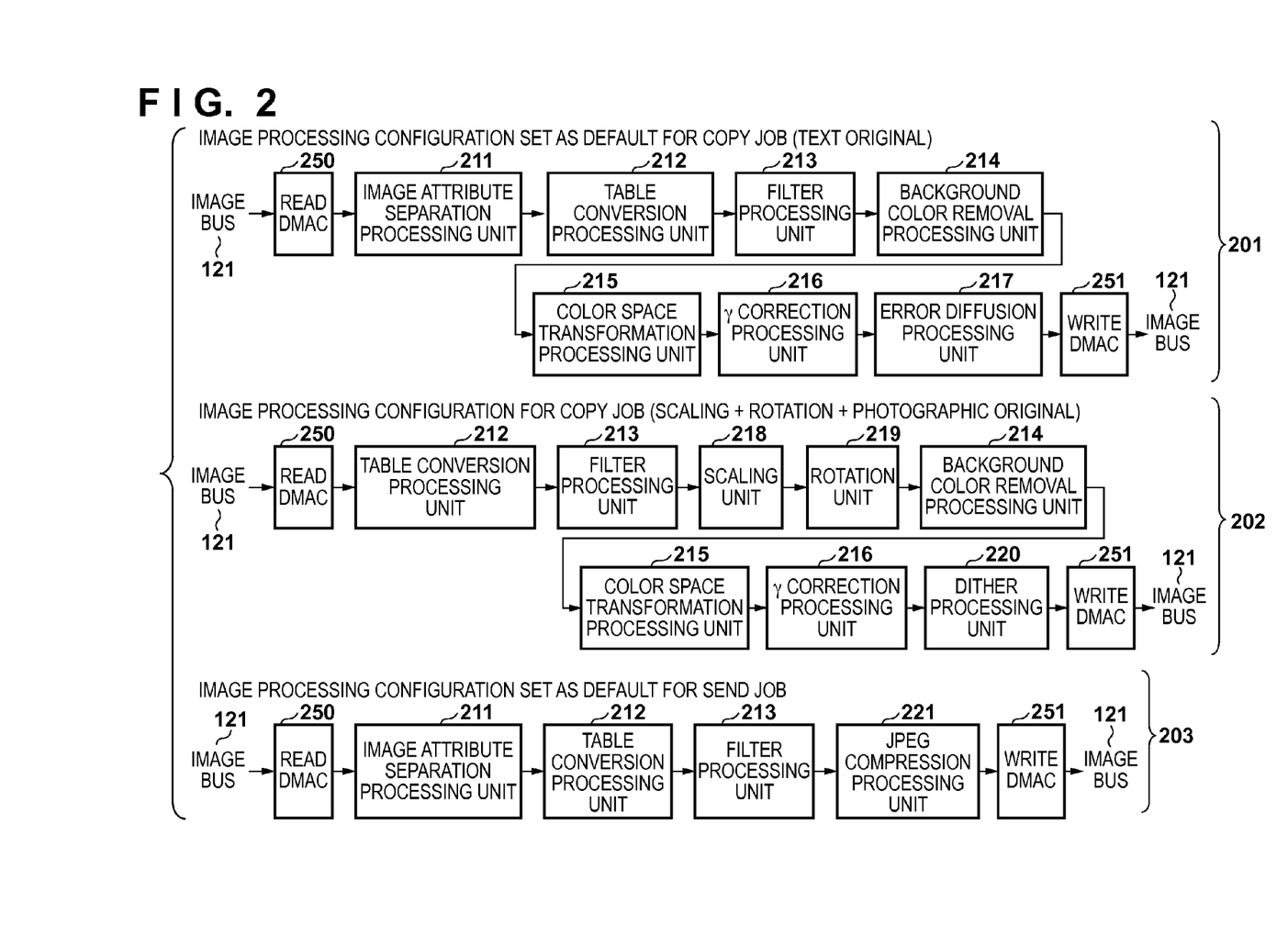
FIG. 2 is a diagram illustrating the functions of the image processing apparatus according to the first embodiment and image processing functions configured in a dynamic reconfiguration unit.

Reference numeral 201 shown in FIG. 2 indicates a default image processing configuration set for copy job configured in the reconfiguration unit 131 when a copy job is executed as a default setting without a setting change being made. The default image processing configuration set for copy job includes a read DMAC (DMA controller) 250 for reading an image from the RAM 111 via the image bus 121 and a write DMAC 251 for writing the image into the RAM 111. The default image processing configuration set for copy job further includes an image attribute separation processing unit 211, a table conversion processing unit 212, a filter processing unit 213, a background color removal processing unit 214, a color space transformation processing unit 215, a γ correction processing unit 216, and an error diffusion processing unit 217.

Upon execution of the copy job, image data input from the scanner unit 109 is input into the read DMAC 250, processed by the image processing functions (functional blocks) 211 to 217 and written into the RAM 111 by the write DMAC 251. The image attribute separation processing unit 211 detects a character area from the input image so as to determine an image attribute, and generates an image attribute signal that is to be used in subsequent image processing. The table conversion processing unit 212 performs a table conversion in order to convert the read image data, which is brightness data, into intensity data. The filter processing unit 213 performs computing processing by using a digital spatial filter designed for a particular application such as, for example, edge enhancement. The background color removal processing unit 214 performs processing for, when image data obtained by reading an original having a light-colored background is received, removing the background color. The color space transformation processing unit 215 converts RGB data into CMYK data according to the output characteristics of the image processing apparatus. The γ correction processing unit 216 converts the intensity of the image data. The error diffusion processing unit 217 performs half-tone processing by comparing the input image data with a predetermined threshold value so as to perform an n-value conversion, and spreading the resulting difference between the input image data and the threshold value to surrounding pixels that are subsequently subjected to n-value conversion processing. The image data that has undergone the above image processing operations is transferred to the printer I/F 106 via the image bus 121 and output from the printer unit 107. The flow described above is, of course, merely an example, and it is therefore possible to configure another image processing function in the reconfiguration unit 131 so as to perform processing.

Reference numeral 202 shown in FIG. 2 indicates image processing functions configured in the reconfiguration unit 131 when the same copy job as that used in the configuration 201 is executed after a setting change is made by the user via the operation unit 103, rather than executed by the default configuration. The configuration 201 is an image processing function configuration that is set as default and optimized to copy a text original, but the configuration 202 is an image processing function configuration in the case where a photographic original is used, and rotation and scaling functions are set. The configuration 202 is different from the configuration 201 in that the image attribute separation processing unit 211 is not configured, and a dither processing unit 220 is configured in place of the error diffusion processing unit 217. This is because the type of original has been changed from "text original" set as default to "photographic original". The dither processing unit 220 performs, as half-tone processing, an n-value conversion by using a plurality of predetermined dither matrices and the input image data. A scaling processing unit 218 and a rotation processing unit 219 are additionally configured according to the setting change. The scaling processing unit 218 performs magnification and demagnification processing on the image data. The rotation processing unit 219 performs rotation processing for changing the direction of the image data. The other image processing functions are the same as those of the configuration 201. As described above, even if the same copy job is performed, the content of processing is changed according to a setting being made by the user, and the image processing function configuration is partially changed according to the change.

Reference numeral 203 shown in FIG. 2 indicates image processing functions configured in the reconfiguration unit 131 when a send job is executed as a default setting without a setting change being made. An image processing configuration for send job will be described by using the configuration 203. The image processing configuration for send job includes, as in the configuration 201, the read DMAC 250 and the write DMAC 251 that perform image transfer via the image bus 121, the image attribute separation processing unit 211, the table conversion processing unit 212 and the filter processing unit 213. It further includes a JPEG compression processing unit 221 that performs JPEG compression so as to efficiently transmit image data to an external general-purpose computer via the network I/F 102. The image data that has undergone the above image processing operations is stored in the RAM 111, and thereafter transferred to an external general-purpose computer via the network I/F 102. The flow described above is, of course, merely an example, and it is therefore also possible to perform processing by configuring another image processing function in the reconfiguration unit 131.

In the present embodiment, image processing is performed by appropriately configuring the image processing functions described with reference to FIG. 2 in the reconfiguration unit 131. The jobs that can be processed by the image processing apparatus 100 are not limited to those shown in FIG. 2. Also, the image processing units are not limited to those shown in FIG. 2, and it is also possible to divide the processing included in each image processing into finer components (granularity).

Config data can be configured in processing units described in the configurations 201 to 203 shown in FIG. 2. For example, one piece of config data can be prepared by including all of the read DMAC 250, the image processing units (211 to 217) and the write DMAC 251. It is also possible to prepare separate pieces of config data respectively for the DMACs 250 and 251 that perform data transfer, the image processing units 211 to 213 that perform reading, the image processing units 214 to 217 that perform print output, and the image processing units 218 and 219 that perform editing processing. In the case of preparing separate pieces of config data, for execution of a copy job, a circuit necessary to execute the copy job can be configured by partially reconfiguring the separate pieces of config data in the reconfiguration unit 131. It is of course possible to prepare config data in even finer components. It is possible to, for example, prepare a separate piece of config data for each of the image processing units (211 to 221), the read DMAC 250 and the write DMAC 251.

Operation Unit

Figure 3:
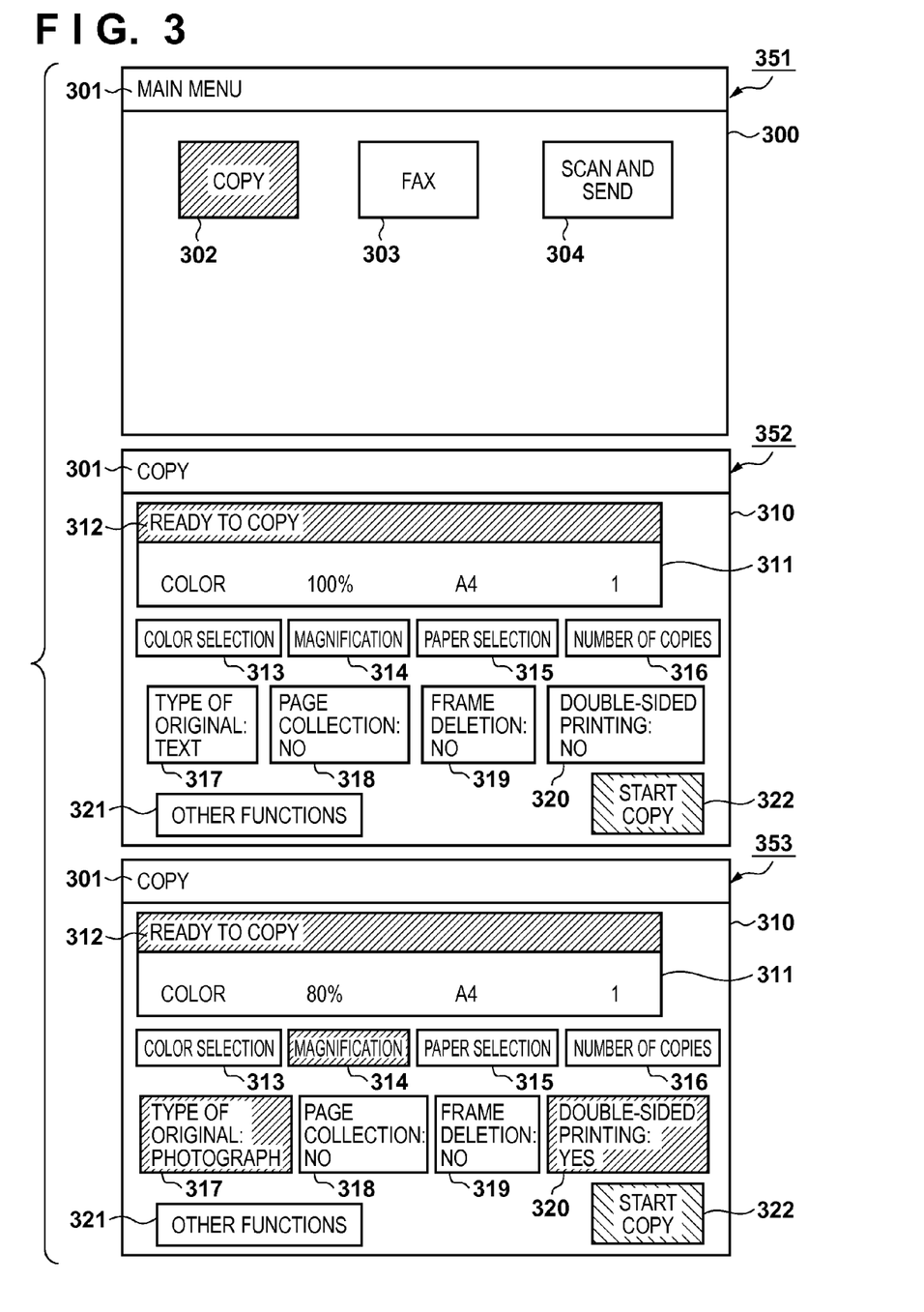
FIG. 3 shows an operation unit for accepting a setting change from a user which is provided in the image processing apparatus according to the first embodiment.

Next is a description of display items displayed on the operation unit 103 of the image processing apparatus 100 of the present embodiment and transition of the display items performed as a result of a change being made in the setting items by the user with reference to FIG. 3. In the present embodiment, the operation unit 103 is configured by a liquid crystal screen and a touch panel. The present invention is not limited thereto, and the operation unit 103 may of course be configured by another alternative.

Reference numeral 351 shown in FIG. 3 indicates a user interface (UI) screen displayed on the operation unit 103 after the image processing apparatus 100 is turned on or when an operation for recovering from a sleep state for saving power is performed by the user. Usually, a main menu screen 300 is displayed after power is turned on or after recovery from the sleep state. On the main menu screen 300, a hierarchy display portion 301 for showing the user the current menu hierarchy is displayed. Job selection icons 302 to 304 for selecting a job that can be executed by the image processing apparatus 100 are also displayed on the main menu screen 300. The job selection icons 302 to 304 respectively indicate a copy job, a fax job and a send job. The jobs that can be processed by the image processing apparatus 100 are not limited to the examples shown on the screen 351.

Reference numeral 352 shown in FIG. 3 indicates a copy setting screen 310 that is displayed after the copy job selection icon 302 is selected by the user on the main menu screen 300. On the copy setting screen 310, a setting value display portion 311 that displays the current basic setting values in a list is displayed. In the setting value display portion 311, a status notification unit 312 that notifies the user whether the image processing apparatus 100 is now ready to start the job is displayed. In addition, in the setting value display portion 311, basic setting values such as whether to read the original in color or monochrome, magnification, paper size and the number of copies output are displayed in a list. On the copy setting screen 310, setting change icons 313 to 320 for changing various frequently used setting values are displayed. The icons include a color selection icon 313 for selecting whether to read an original in color or monochrome, a magnification icon 314 for changing the magnification, a paper selection icon 315 for changing the type of paper, and a copy number icon 316 for changing the number of copies.

An original type setting icon 317 for setting the type of original to photograph alone, a combination of photograph and text, or text alone is also displayed on the copy setting screen 310. A page collection setting icon 318 for collectively outputting a plurality of pages of an original read by the scanner unit 109 in one page is also displayed on the copy setting screen 310. A frame deletion setting icon 319 for deleting an unnecessary area in the blank space of the original is also displayed on the copy setting screen 310. A double-sided printing setting icon 320 for printing images on both sides of a sheet of paper by the printer unit 107 is also included in the copy setting screen 310. A residual function setting icon 321 for making a change in other setting items that are not displayed on the screen is also displayed on the copy setting screen 310. A copy start icon 322 that issues an instruction to start a copy operation to the image processing apparatus 100 is also displayed.

In the present embodiment, the copy job setting items and the setting change icons 313 to 321 displayed on the copy setting screen 310 are not limited to those shown on the screen 352. As shown in the screen 352, most frequently used setting values are already set as a default setting of the copy job immediately after the selection of the copy job selection icon 302 on the main menu screen 300. The default setting values shown here are not limited to those shown on the screen 352.

Reference numeral 353 shown in FIG. 3 indicates a screen displayed on the operation unit 103 after various setting changes are made on the copy setting screen 310 of the screen 352 by the user. In the example shown on the screen 353, the magnification is changed to 80%, the type of original is changed to photograph, and the type of printing is changed to double-sided printing. In order to notify the user that the setting values have been changed, for example, the color of the setting change icons 314, 317 and 320 whose setting values have been changed is changed. By selecting the copy start icon 322 in this state, the image processing apparatus 100 starts the copy job based on the values set by the user.

In the present embodiment, if the copy job selection icon 302 is selected on the screen 351, the configuration 201 shown in FIG. 2 including image processing functions set as default for copy job is configured in the reconfiguration unit 131. To be specific, config data for implementing the image processing functions of the configuration 201 stored in the ROM 104 is transferred to the reconfiguration unit 131 as appropriate by the config controller 130, and then configured. The config data is not necessarily read directly from the ROM 104, and it is also possible to copy the config data into the RAM 111 in advance and read the copied config data.

If the magnification icon 314 is selected on the screen 352 shown in FIG. 3 and the copy magnification is changed, the scaling processing unit 218 is instantly configured into the reconfiguration unit 131 as shown in the configuration 202 in FIG. 2. To be specific, the config controller 130 transfers config data for configuring the scaling processing unit 218 to the reconfiguration unit 131. As described above, in the case where the granularity of config data is divided into the image processing units 211 to 221, in order to add the scaling processing unit 218, it is necessary to perform a transposition operation on the pipeline processing so as to change the processing order. In order to suppress an increase in the configuration time due to the transposition operation, the image processing functions may be configured with a crossbar switch or the like. A case is also conceivable in which the granularity of config data is not divided into the image processing units 211 to 221 and thus is coarser. In this case, the reconfiguration unit 131 is configured by using config data including the scaling processing unit 218. Likewise, if the type of original is changed from text to photograph on the screen 352 shown in FIG. 3, the image attribute separation processing unit 211 included in the configuration 201 is instantly removed from the reconfiguration unit 131, and the error diffusion processing unit 217 is replaced by the dither processing unit 220. Likewise, if the type of printing is changed to double-sided printing on the screen 352 shown in FIG. 3, the rotation processing unit 219 is instantly added to the reconfiguration unit 131. Other than the above, if a setting for executing the copy job is changed on the screen 352 shown in FIG. 3, the corresponding image processing unit is configured as appropriate in the reconfiguration unit 131.

When the configuration is changed by a setting change, a portion that has not changed from the default configuration is retained in the reconfiguration unit 131. In other words, dynamic reconfiguration is partially performed. Accordingly, the configuration of the other portion may be in operation. However, as described above, if a need for transposition in the pipeline arises, it is necessary to perform a transposition operation as appropriate.

Sequence of Reconfiguration Control

Figure 4:
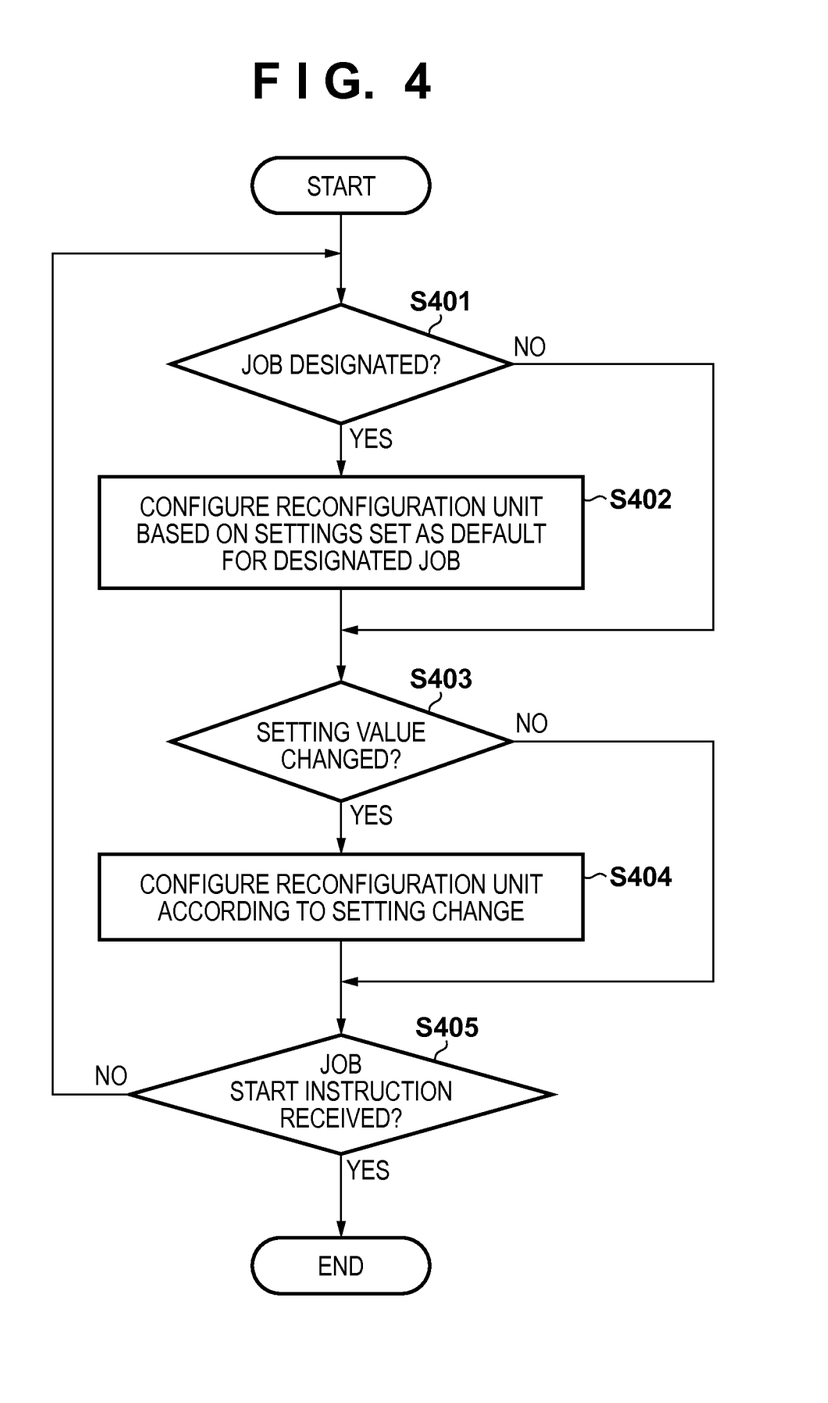
FIG. 4 is a flowchart illustrating control performed to reconfigure an image processing unit when a setting change is made to the image processing apparatus according to the first embodiment.

Next is a description of a procedure of control of the config controller 130 for changing the configuration of the reconfiguration unit 131 in response to a setting change from the operation unit 103 of the image processing apparatus according to the embodiment of the present invention, with reference to FIG. 4. The processing described below is implemented by the CPU 101 reading a control program stored in advance in the ROM 104 or the like into the RAM 111 and executing the program. This control flow starts at a timing when the main menu screen 300 is displayed on the operation unit 103 after power is turned on or after recovery from the sleep state.

In S401, the CPU 101 determines whether or not a job has been designated via the operation unit 103. If it is determined that a job has been designated, the procedure transitions to S402. If it is determined that a job has not been designated, the procedure transitions to S403. As used herein, the expression "a job has been designated" means that any one of the job selection icons 302 to 304 has been selected on the main menu screen 300, or a job change icon or the like has been selected on the copy setting screen 310 or the like.

In S402, the CPU 101 configures the image processing function configuration set as default for the job designated in S401 in the reconfiguration unit 131, and then the procedure transitions to S403. For example, if the copy job selection icon 302 is selected, the image processing function configuration 201 shown in FIG. 2 is configured. As a result of control in S402, even when the copy job selection icon 302 is selected and immediately after the copy start icon 322 is selected without a setting change being made, the time required to start processing can be shortened.

In S403, the CPU 101 determines whether or not the operation unit 103 has accepted a setting value change. If it is determined that a setting change has been accepted, the procedure transitions to S404. If it is determined that a setting value change has not been accepted, the procedure transitions to S405. In S404, the CPU 101 configures an image processing function corresponding to the changed setting item into the reconfiguration unit 131. Here, addition, removal and transposition of image processing functions with respect to the reconfiguration unit 131 are performed. In S405, the CPU 101 determines whether or not a request to start the job has been input from the operation unit 103. If it is determined that a request to start the job has been input, the control flow ends. If it is determined that a request to start the job has not been input, the procedure returns to S401, where the reconfiguration unit 131 is configured as appropriate according to the setting change. Here, in the example of the screen 353 shown in FIG. 3, the request to start the job is issued upon selection of the copy start icon 322.

Processing Time Chart

Figure 5:
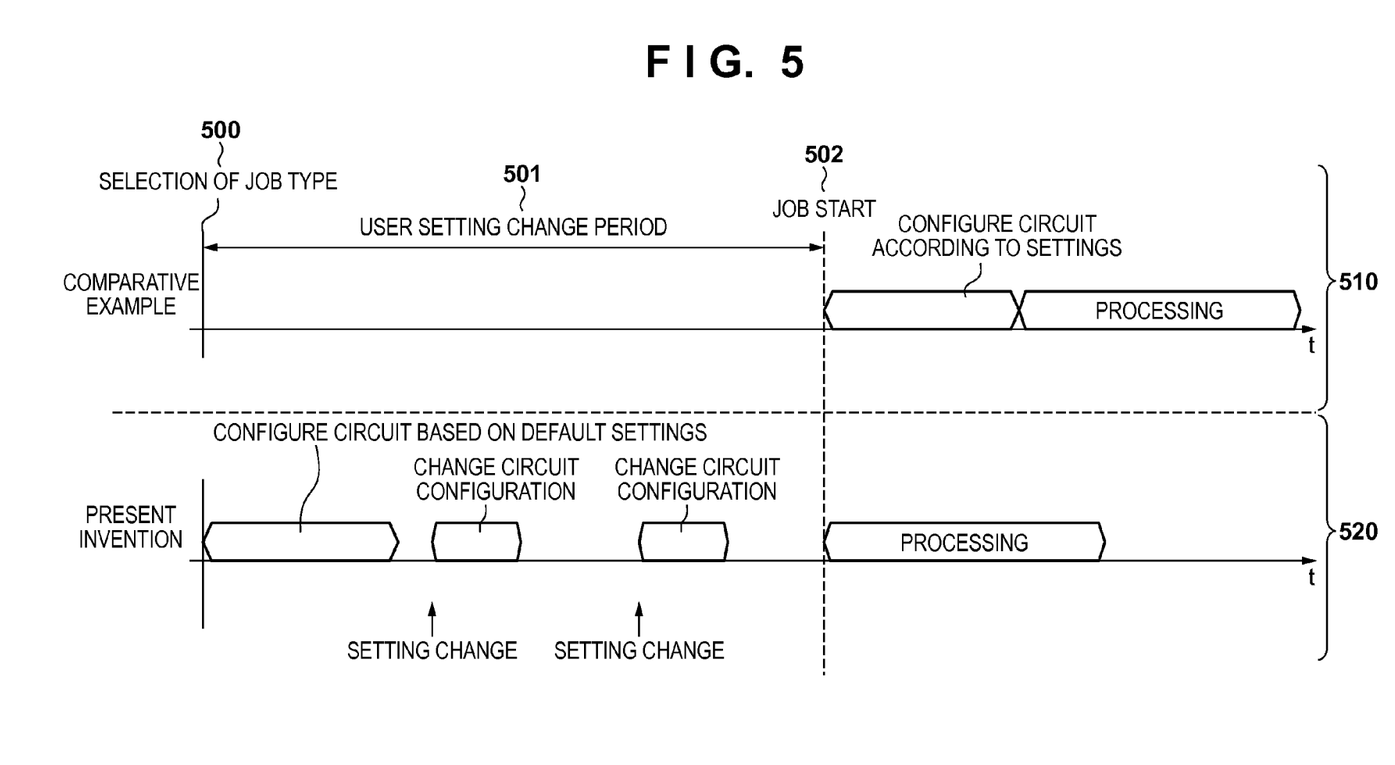
FIG. 5 is a time chart showing the effect of reducing the processing time according to the first embodiment.

A processing time chart according to the present embodiment will be described next with reference to FIG. 5. Reference numeral 510 shown in FIG. 5 indicates a processing time chart serving as a comparative example. Reference numeral 520 indicates a processing time chart according to the present invention. Selection of job type 500 shown in FIG. 5 indicates the time when any one of the job selection icons 302 to 304 is selected on the main menu screen 300 and the job type is determined. After that, a job start 502 is performed in which a request to start the job is issued. The time period from the time 500 to the time 502 is a user setting change period 501. The setting change period 501 indicates, in the case of a copy job, for example, the time period from when the copy setting screen 310 is displayed on the operation unit 103 until when a setting change from the user is accepted.

In the comparative example 510, no processing is performed on the reconfiguration unit 131 during the period indicated by the setting change period 501. In the comparative example 510, the reconfiguration unit 131 is configured according to the fixed setting item at the time of the job start 502, and after that, copy processing starts. In contrast, in the present invention 520, the image processing functions set as default are first configured in the reconfiguration unit 131 at the time of the selection of job type 500. After that, in the setting change period 501, the configuration of the reconfiguration unit 131 is changed instantly upon receipt of a setting change. By doing so, the image processing functions in which the user setting is reflected are already configured in the reconfiguration unit 131 at the time when a request to start the job is issued. Accordingly, copy processing starts instantly at the time of the job start 502. By applying the present invention in the manner described above, it is possible to shorten the time it takes to start processing after a request to start the job is issued from the user.

As described above, if the user selects a job that needs to be executed, the image processing apparatus 100 of the present embodiment reconfigures the reconfiguration unit 131 so as to provide an image processing function configuration suitable for the selected job. If a specific setting is made in the settings of the selected job, the reconfiguration unit 131 is updated as appropriate so as to provide a configuration for executing the specific setting. By doing so, it is possible to start reconfiguration of a required image processing function configuration before receipt of a start request (start instruction) from the user, and thus the time required to start processing can be shortened as compared to the configuration in which reconfiguration is performed after receipt of a start request.

Second Embodiment

Hereinafter, a second embodiment of the present invention will be described with reference to FIGS. 6 to 9. In the first embodiment given above, a case was described in which all of the image processing functions of each job (for example, the configuration 201 shown in FIG. 2) can be configured in the reconfiguration unit 131. In the second embodiment, a case will be described in which a low-capacity FPGA is used and thus not all of the image processing functions of each job are fitted in the reconfiguration unit 131. To be specific, the second embodiment is provided to implement all of the image processing functions by dividing the image processing functions shown in FIG. 2 into a plurality of stages, and switching the image processing functions divided into the plurality of stages by dynamic reconfiguration during execution of the job. Such a method for implementing various functions with the use of a fewer resources by performing dynamic reconfiguration during execution of the job is well known in a dynamic reconfigurable processor (DRP) or the like. In the dynamic reconfiguration during execution of the job, the time required to perform reconfiguration directly leads to an increase in the processing time. Accordingly, in order to shorten the reconfiguration time, a method is known in which config data is written (copied) in advance from the ROM 104 having a slow access speed into the RAM 111 having a fast access speed, and then read from the RAM 111 at a high speed. This method is called "pre-loading". The high-speed memory used in pre-loading is not limited to the RAM 111 serving as a system work memory. Examples of other pre-load memories include a block RAM provided in an FPGA, and a dedicated pre-load memory having a plurality of BANKs as used in a DRP or the like.

A difference between the present embodiment and the first embodiment is that the config data pre-loaded from the ROM 104 into the RAM 111 is replaced as appropriate according to changes in the setting items made by the user. This is important when it is not possible to secure a sufficient capacity as a pre-load memory because the RAM 111 is used as a system work memory and an image memory. To be specific, no problem arises if all of the config data stored in the ROM 104 are copied into the RAM 111, but otherwise, it is necessary to selectively pre-load the config data.

Config Data

First, an image processing function configuration in each stage when the reconfiguration unit 131 is dynamically reconfigured during execution of a job according to the present embodiment will be described with reference to FIG. 6. Reference numerals 601 to 603 shown in FIG. 6 indicate config data set as default for image reading processing, editing processing and image output processing obtained by dividing the image processing functions used to execute a copy job. The granularity (components) into which the image processing functions are divided is not limited to that described above. Upon execution of a copy job, the config data 601 to 603 set as default are sequentially configured into the reconfiguration unit 131. To be specific, in order to perform image reading processing on the image data read by the scanner unit 109, the config data 601 set as default for image reading processing is configured into the reconfiguration unit 131.

As a result of the image reading processing performed on the image data in the reconfiguration unit 131, intermediate data is generated. The intermediate data is stored into the RAM 111 by the write DMAC 251. Subsequently, the config data 602 set as default for editing processing is configured into the reconfiguration unit 131, and editing processing is performed on the intermediate data that has undergone image reading processing. Likewise, the intermediate data that has undergone editing processing is stored into the RAM 111. Next, the config data 603 set as default for image output processing is configured into the reconfiguration unit 131, and image output processing is performed. The data that has undergone all of the image processing operations is output to the printer unit 107, whereby processing of one page ends. After completion of the processing of one page, the config data 601 set as default for image reading processing is again configured into the reconfiguration unit 131, and processing of a second page thereby starts.

Figure 6:
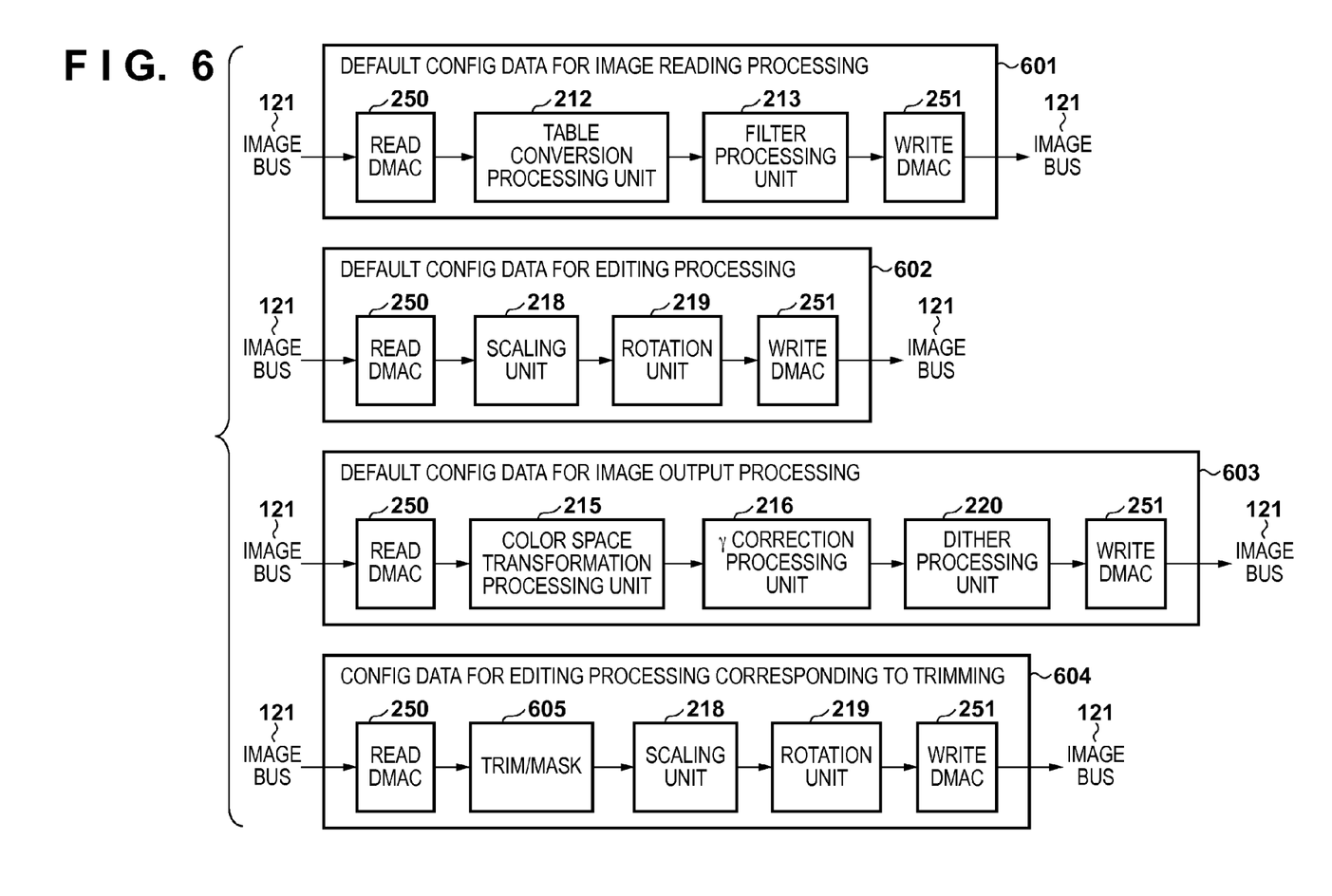
FIG. 6 is a diagram illustrating image processing functions configured in each step during dynamic reconfiguration performed in an image processing apparatus according to a second embodiment.

Reference numeral 604 shown in FIG. 6 indicates config data corresponding to a trim/mask function that is used in editing processing to clip a designated area in an image or mask the image with white data or the like. A difference from the config data 602 set as default for editing processing is that a trim/mask unit 605 is included. The config data 604 is used instead of the config data 602 according to the content of the setting made by the user.

Transition of Config Data

Figure 7:
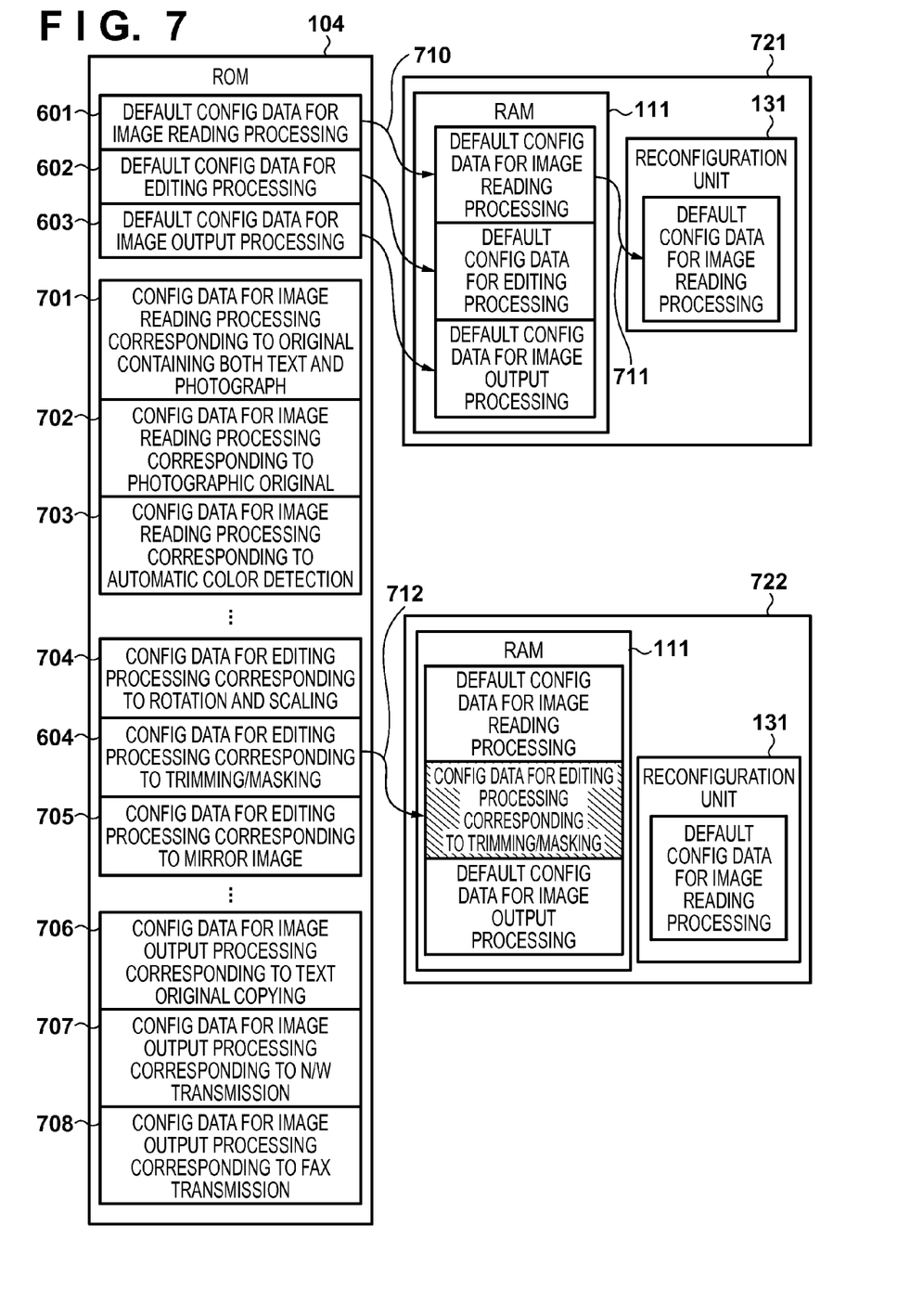
FIG. 7 is a diagram illustrating a transition of config data read by the image processing apparatus according to the second embodiment.

Next is a description of a transition of config data pre-loaded into the RAM 111 upon a setting change being made by the user according to the present embodiment, with reference to FIG. 7.

All config data that can be configured into the reconfiguration unit 131 are stored in the ROM 104, and the config data 601 to 603 set as default for image reading processing, image editing processing and image output processing are stored as a default setting. Config data 701 to 703 for image reading processing corresponding to some setting changes are also stored. For example, the config data 701 optimized to read an original containing both text and a photograph, the config data 702 optimized for a photographic original, and the config data 703 corresponding to automatic color detection are stored. The granularity or the number of pieces of config data corresponding to each setting is not limited to that described above. Also, config data 704, 604 and 705 corresponding to the settings for editing processing are stored in the ROM 104. Config data 706 to 708 corresponding to the settings for image output processing are also stored in the ROM 104.

Reference numeral 721 indicates config data pre-loaded into the RAM 111 and config data configured in the reconfiguration unit 131 if a specific one of the job selection icons 302 to 304 is selected on the main menu screen 300. In this case, for example, upon selection of the copy job selection icon 302, the config data 601 to 603 set as default for image reading processing, editing processing and output processing that are used in a copy job are pre-loaded into the RAM 111 as indicated by arrows 710. If another job selection icon 303 or 304 is selected, optimal config data set as default for the selected job is pre-loaded from the ROM 104. The pre-loaded config data set as default for each job is not limited to that described above. Also, in the present embodiment, in the memory area of the RAM 111, an area for pre-loading having a capacity enough to store the size of three config data such as image reading processing, editing processing and output processing is allocated. Here, the size of the memory area allocated as the area for pre-loading is not limited to that described above, and may be changed according to the system configuration, the granularity into which config data is divided by dynamic reconfiguration, or the like.

Among the config data pre-loaded into the RAM 111, the config data 601 set as default for image reading processing, which is used first in the job, is configured into the reconfiguration unit 131 as indicated by arrow 711.

Reference numeral 722 indicates replacement of the config data pre-loaded into the RAM 111 when a setting change is made by the user on the copy setting screen 310. This indicates the case in which, for example, the frame deletion setting icon 319 is selected so as to delete the frame. As a result of the frame deletion being set, as indicated by arrow 712, the config data 604 corresponding to the trim/mask function is stored into the RAM 111 because the config data 602 set as default for editing processing cannot be used to perform the image processing function. At this time, three pieces of config data have already been pre-loaded in the RAM 111, and thus for example, the area of the config data 602 set as default for editing processing is overwritten by the config data 604. Also, in the image reading processing, a change in the image processing function configuration due to the setting change is unnecessary, and thus the configuration of the reconfiguration unit 131 is not changed. If it is necessary to change the image processing function configuration of the image reading processing due to the setting change, such a case requires not only replacement of the pre-loaded config data but also changing of the configuration of the reconfiguration unit 131.

Reconfiguration Control Sequence

Figure 8:
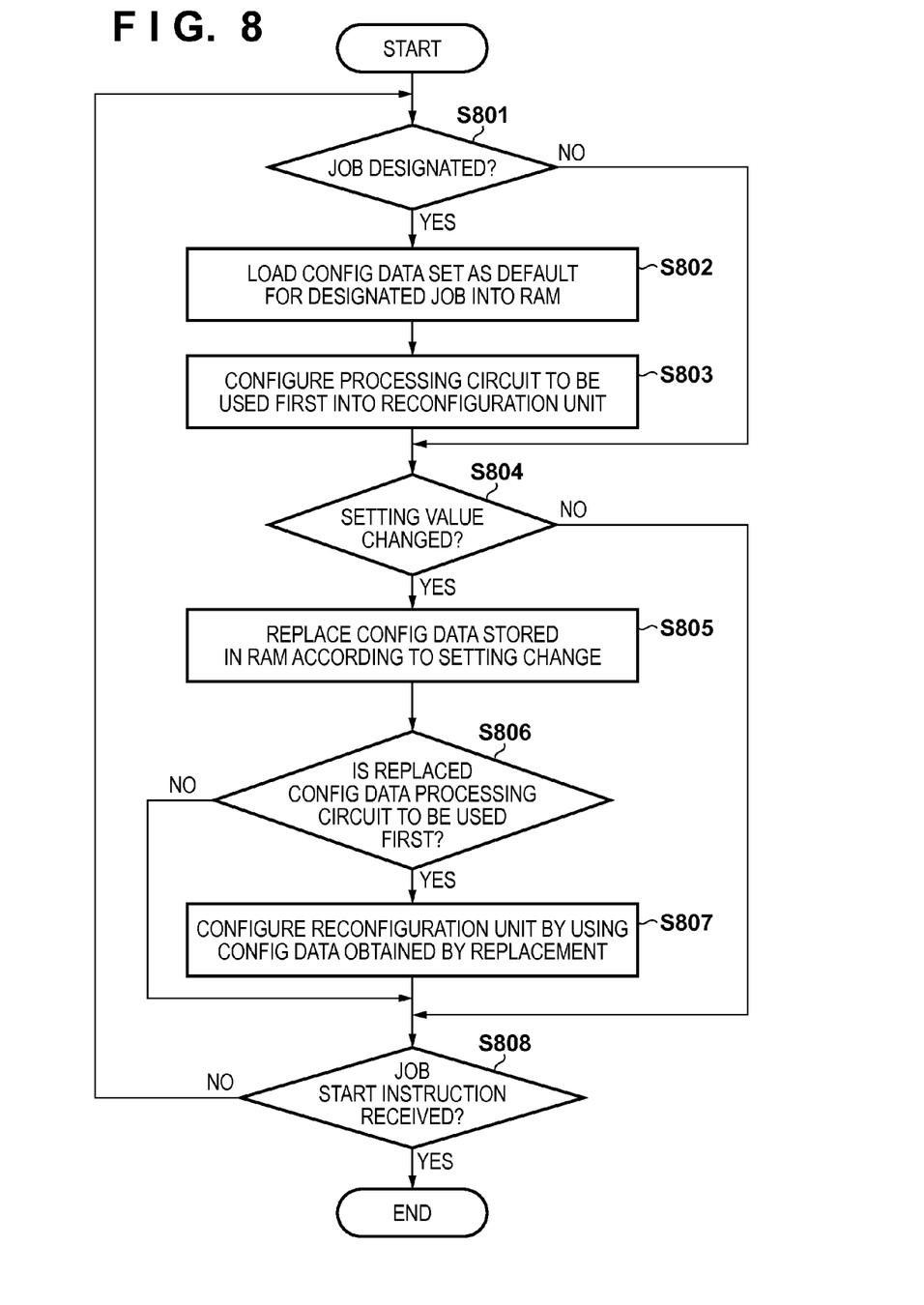
FIG. 8 is a flowchart illustrating control performed to reconfigure an image processing unit and control performed to read config data when a setting change is made to the image processing apparatus according to the second embodiment.

Next is a description of a procedure of control of the config controller 130 for changing the configuration of the reconfiguration unit 131 in response to a setting change from the operation unit 103 of the image processing apparatus according to the embodiment of the present invention, with reference to FIG. 8. The processing described below is implemented by the CPU 101 reading a control program stored in advance in the ROM 104 or the like into the RAM 111 and executing the program. A difference from the first embodiment is that in steps S402 and S404, replacement of the pre-loaded config data and determination of whether it is necessary to change the image processing function configuration to be used first in the job are added. The other elements in the sequence are basically the same as those of the first embodiment, and thus a description thereof is omitted here. Hereinafter, differences from the first embodiment will be mainly described. To be specific, steps S801, S804 and S808 respectively correspond to steps S401, S403 and S405, and thus a description thereof is omitted here.

In S802, the CPU 101 functions as a writing unit, and pre-loads the config data set as default for the job from the ROM 104 into the RAM 111. Subsequently, in S803, the CPU 101 configures, into the reconfiguration unit 131, the config data of the image processing function to be used first in the job from among the config data pre-loaded in S802.

Next, in S805, the CPU 101 replaces the config data pre-loaded in the RAM 111 according to the change made in the setting items. Subsequently, in S806, the CPU 101 determines whether or not the config data replaced in S805 is the config data of the image processing function to be used first. If it is determined that the config data replaced in S805 is the config data of the image processing function to be used first, the procedure transitions to S807. If, on the other hand, it is determined that the config data replaced in S805 is not the config data of the image processing function to be used first, the procedure transitions to S808. In S807, the CPU 101 configures the reconfiguration unit 131 by using the config data replaced in S805. To be specific, in the present embodiment, the content of the config data pre-loaded in the RAM 111 is first updated according to the input of settings, a setting change or the like performed by the user, and thereafter the reconfiguration unit 131 is reconfigured.

Processing Time Chart

Figure 9:
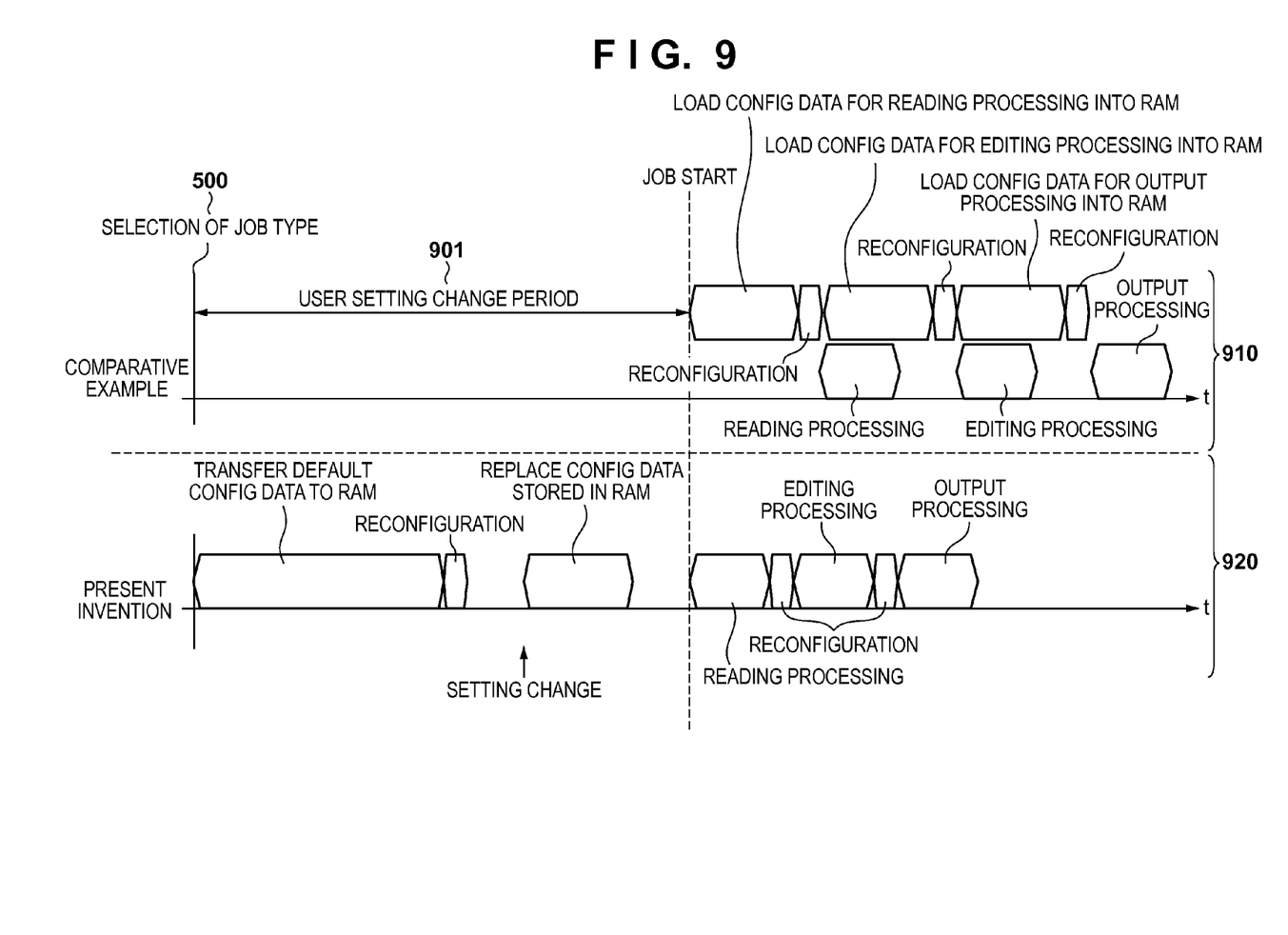
FIG. 9 is a time chart showing a time reduction effect according to the second embodiment.

A processing time chart according to the present embodiment will be described next with reference to FIG. 9. As in the first embodiment described above, in the case where the present invention is applied, as indicated by 920, image processing functions in which the setting change is reflected have been configured in the reconfiguration unit 131 at a timing when a request to start the job is issued. This is because during the user setting change period, the config data in the RAM 111 is updated as appropriate in response to a user operation, or in other words, a setting change, and reconfiguration of the reconfiguration unit 131 is also started. In addition, config data in which the setting change is reflected has been pre-loaded into the RAM 111. Accordingly, processing starts immediately after a request to start the job is issued.

On the other hand, in the comparative example, as indicated by 910, loading of config data in which the setting change is reflected into the RAM 111 starts after the request to start the job is issued. In the comparative example, first, the config data for image reading processing to be used first is pre-loaded into the RAM 111. After the reconfiguration unit 131 has been configured by using the pre-loaded config data for image reading processing, image reading processing starts.

After that, in the comparative example, the config data for editing processing to be used next is pre-loaded in parallel to the image reading processing in the reconfiguration unit. Generally, it takes time to perform reading from a ROM having a slow access speed, and thus there is a good possibility that a situation will occur in which the processing is put on hold because pre-loading has not been finished despite the fact that the image reading processing of one page has been finished. Likewise, in the comparative example, the config data for output processing is pre-loaded, and after the data has been pre-loaded and the reconfiguration unit 131 has been configured, image output processing is performed. With respect to the processing of the second and subsequent pages, in the comparative example as well, pre-loading has already been finished, and thus a situation as described above in which the processing is put on hold does not occur. However, in the case where the present invention is applied, it is possible to shorten the time required to start processing the first page and the time required to complete the processing of the first page.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-050534 filed on Mar. 13, 2014, which is hereby incorporated by reference herein in its entirety.

What is claimed is:

1. An image processing apparatus including a reconfigurable circuit in which functional blocks that perform image processing can be reconfigured, the image processing apparatus comprising:

a memory device configured to store in advance configuration data, for each plurality of the functional blocks, for configuring the functional blocks in the reconfigurable circuit; and a CPU coupled to the memory device, wherein the CPU is programmed to function as:

a first receiving unit configured to receive a designation of a job to be executed;

a first reconfiguration unit configured to read out, from the memory device, necessary configuration data for executing the designated job before receiving a start instruction of the job, and reconfigure the reconfigurable circuit;

a second receiving unit configured to receive a setting value designated for executing the designated job;

a second reconfiguration unit configured to read out, from the memory device, necessary configuration data for executing the designated job using the designated setting value before receiving a start instruction of the job, and reconfigure the reconfigurable circuit by updating the reconfigurable circuit reconfigured by the first reconfiguration unit; and a job execution unit configured to execute the job by executing a processing using the reconfigurable circuit reconfigured by the second reconfiguration unit when accepting the start instruction of the job.

2. The image processing apparatus according to claim 1, wherein the second reconfiguration unit is configured to, in a case in which functional blocks which are different from the reconfigured functional blocks are required for executing the designated job using the designated setting value, update the reconfigurable circuit reconfigured by the first reconfiguration unit.

3. The image processing apparatus according to claim 1, wherein the reconfigurable circuit is a circuit in which only a part of the circuit configuration can be reconfigured.

4. The image processing apparatus according to claim 1, wherein the first receiving unit receives the job designated via an operation unit by a user and from among a plurality of types of jobs, as a job to be executed for an image subject to processing.

5. The image processing apparatus according to claim 1, wherein the second receiving unit receives the setting value designated via an operation unit by a user and from among a plurality of types of setting values, as a setting value when the designated job is executed.

6. The image processing apparatus according to claim 1, wherein the job execution unit executes the job using the reconfigurable circuit reconfigured by the first reconfiguration unit in a case in which the start instruction of the job is received before the second receiving unit receives the setting value.

7. A control method for controlling an image processing apparatus including a reconfigurable circuit in which functional blocks that perform image processing can be reconfigured, and a memory device configured to store in advance configuration data, for each plurality of the functional blocks, for configuring the functional blocks in the reconfigurable circuit, the method comprising:

receiving a designation of a job to be executed;

in a first reconfiguration unit, reading out, from the memory device, necessary configuration data for executing the designated job before receiving a start instruction of the job, and reconfiguring the reconfigurable circuit;

receiving a setting value designated for executing the designated job;

in a second reconfiguration unit, reading out, from the memory device, necessary configuration data for executing the designated job using the designated setting value before receiving a start instruction of the job, and reconfiguring the reconfigurable circuit by updating the reconfigurable circuit reconfigured by the first reconfiguration unit; and executing the job by executing a processing using the reconfigurable circuit reconfigured by the second reconfiguration unit when accepting the start instruction of the job.

8. A non-transitory computer-readable storage medium storing a computer program for causing a computer to execute a method of controlling an image processing apparatus for controlling an image processing apparatus including a reconfigurable circuit in which functional blocks that perform image processing can be reconfigured, and a memory device configured to store in advance configuration data, for each plurality of the functional blocks, for configuring the functional blocks in the reconfigurable circuit, the method comprising:

receiving a designation of a job to be executed;

in a first reconfiguration unit, reading out, from the memory device, necessary configuration data for executing the designated job before receiving a start instruction of the job, and reconfiguring the reconfigurable circuit;

receiving a setting value designated for executing the designated job;

in a second reconfiguration unit, reading out, from the memory device, necessary configuration data for executing the designated job using the designated setting value before receiving a start instruction of the job, and reconfiguring the reconfigurable circuit by updating the reconfigurable circuit reconfigured by the first reconfiguration unit; and executing the job by executing a processing using the reconfigurable circuit reconfigured by the second reconfiguration unit when accepting the start instruction of the job.

* * * * *